Aug. 7, 1956
L. L. WHITNEY
2,757,764
WELDED TRUSS BRAKE BEAM
Filed May 25, 1951
2 Sheets-Sheet 1
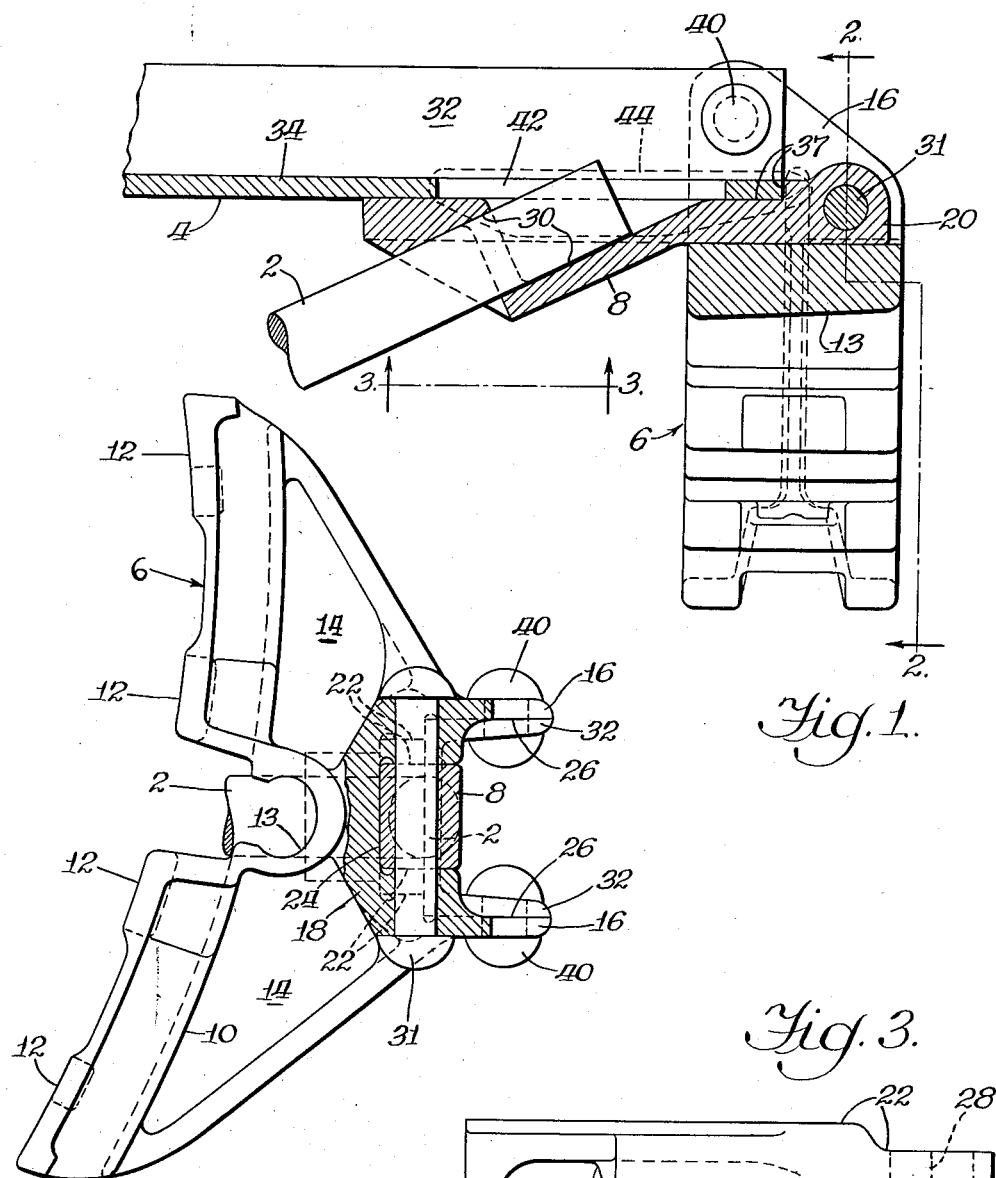
Fig. 1.
Fig. 2.
Fig. 3.
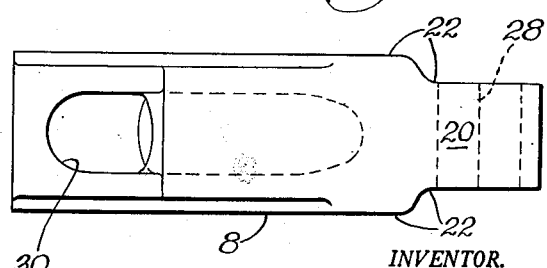
INVENTOR.
Loren L. Whitney
BY
Orrin O. B. Garner
Atty

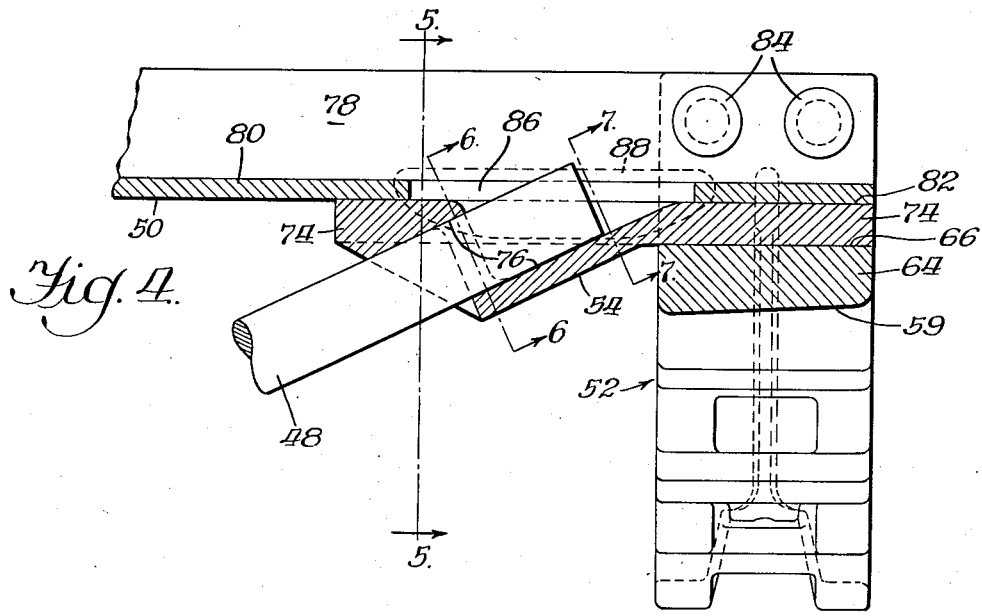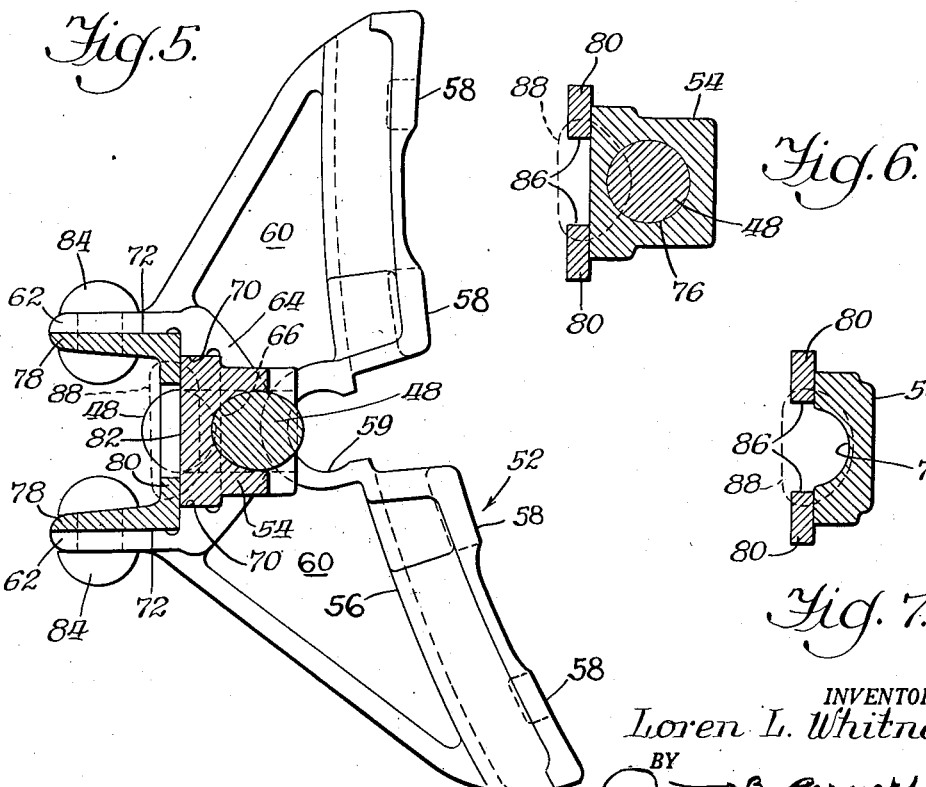

United States Patent Office 2,757,764
Patented Aug. 7, 1956

2,757,764

WELDED TRUSS BRAKE BEAM

Loren L. Whitney, Los Angeles, Calif., assignor to American Steel Foundries, Chicago, Ill., a corporation of New Jersey Application May 25, 1951, Serial No. 228,290

9 Claims. (Cl. 188—223.1)

My invention relates to brake beams and more particularly to a truss type brake beam having tension and compression members secured to each other at the ends thereof and interconnected intermediate said ends by a strut affording a connection for an associated brake lever.

My invention contemplates a novel brake beam having a brake head secured to each end portion of a truss structure comprising a compression member and a tension member secured to each other at the ends thereof by a weld and interconnected intermediate said ends by a strut, said welded truss ends include a truss lock which facilitates welding and affords reinforcement for the truss ends.

My invention further contemplates a novel brake beam having a shorter than conventional truss structure.

My invention further contemplates a brake beam, as described above, wherein the brake head is riveted to both the truss lock end and the compression member end.

A modification of the invention contemplates a brake beam similar to the above described wherein the brake head is riveted only to the compression member end of the truss structure.

This invention embodies other novel features, details of construction and arrangement of parts which are hereinafter set forth in the specification and claims and illustrated in the accompanying drawings, wherein:

Figure 1 is a fragmentary sectional view through the center of one end of the preferred form of my novel brake beam having similar end portions;

Figure 2 is a sectional view on the line 2—2 of Figure 1;

Figure 3 is a front elevational view of the truss lock shown in Figure 1, as viewed from line 3—3;

Figure 4 is a fragmentary sectional view through the center of one end of a modified form of the novel brake beam having similar end portions;

Figure 5 is a sectional view on the line 5—5 of Figure 4;

Figure 6 is a sectional view on the line 6—6 of Figure 4; and

Figure 7 is a sectional view on the line 7—7 of Figure 4.

Describing the invention in detail and referring first to Figures 1 and 2, my novel brake beam comprises a tension member 2, preferably formed of round stock, a channel or U-section compression member 4, a brake head generally designated 6, and a truss lock 8.

Brake head 6 comprises a front or transverse arcuate wall 10, having integrally formed lugs 12 adapted for connection in the conventional manner to an associated brake shoe (not shown). Intermediate its ends, the wall 10 is preferably provided with a hanger socket 13 (Figure 2) for the reception of an associated hanger (not shown) adapted to afford support for the beam in the conventional manner. Top and bottom vertical ribs 14 are connected to the wall 10, top and bottom walls or webs 16 and rear wall 18. Rear wall 18 is provided with a recess adapted for the reception of outboard end portion or lug 20 of truss lock 8, said recess being defined by surfaces 22 and 24. Walls 16 and 18 define a cavity rearwardly of said recessed portion for the reception of the outboard end of the compression member 4, said cavity is defined by spaced surfaces 26, and rear wall 18.

Truss lock 8 facilitates welding and affords reinforcement for the truss end; said truss lock is provided with the narrow outboard end portion 20 having a vertically disposed hole 28 therein for the reception of a rivet 31 and having a diagonally disposed hole 30 for the reception of tension member 2. Rivet 31 passes through hole 28 securing brake head webs 16 to truss lock 8.

Compression member 4 is a channel or U-section member having top and bottom flanges 32 interconnected by a forward web 34; said compression member having an end portion received within the above mentioned cavity between the walls 16 and 18, flanges 32 being in abutment with top and bottom walls 16, and web 34 being in abutment at its outboard end and its forward surface with a recessed portion 37 of truss lock 8. Brake head 6 is secured to the end portion of compression member 4 at the top and bottom flanges 32 thereof by rivets 40, said flanges preferably tapering toward their rear inboard corners as seen in Figure 1.

Web 34 is provided with a weld slot 42 near the end thereof; said weld slot is an entrance to a welding cavity defined by opening 30 and closed by abutting truss lock 8 with tension member 2 therethrough. By means of any suitable welding method molten metal is flowed into welded slot 42 penetrating a region generally designated 44 to solidly unite tension member 2, truss lock 8, and compression member 4.

A modified form of my novel brake beam is shown in Figures 4 to 7 inclusive comprising a tension member 48 preferably formed of round stock, a channel or U-section compression member 50, a brake head generally designated 52 and a truss lock 54.

Brake head 52 comprises a front or transverse arcuate wall 56 having integrally formed lugs 58 adapted for connection in the conventional manner to an associated brake shoe (not shown). Intermediate its ends, wall 56 is preferably provided with a hanger socket 59 (Figure 5) for the reception of an associated hanger (not shown) adapted to afford support for the beam in the conventional manner. Top and bottom vertical ribs 60 are connected to wall 56, top and bottom walls 62 and rear wall 64. Rear wall 64 is provided with a uniform, substantially U-shaped recess adapted for the reception of the uniform outboard end portion of truss lock 54, said recess being defined by surfaces 66 and 70. Top and bottom walls 62 and rear wall 64 define a cavity rearwardly of said recess for the reception of the outboard end of compression member 50, said cavity being defined by spaced surfaces 72 and rear wall 64.

Truss lock 54 facilitates welding and affords reinforcement for the truss ends; said truss lock is provided with a base portion 74 in abutment with compression member 50 and a diagonally disposed hole 76 for the reception of tension member 48.

U-section compression member 50 comprises top and bottom flanges 78 interconnected by a forward web 80; said compression member having an end portion received within the above mentioned cavity between surfaces 72. The flanges 78 are in abutment with surfaces 72 of top and bottom walls 62, and web 80 is in abutment with surface 82 of truss lock 54. Brake head 52 is secured to the end portion of compression member 50 at top and bottom flanges 78 thereof by rivets 84.

Web 80 is provided with a weld slot 86 near the outboard end thereof; said weld slot is the entrance to a weld cavity closed by the abutting truss lock 54 with tension member 48 therethrough. By means of any suitable welding method molten metal is flowed into weld slot 56, penetrating a region generally designated 88 to solidly unite the tension member 48, truss lock 54, and compression member 50.

It is noted that Figures 5 to 7 inclusive are also representative of corresponding sectional views of Figure 1, inasmuch as the sole difference between the embodiment of Figures 1 to 3 and that of Figures 4 to 7 is the elimination in the latter embodiment of the lug 20 and recess 37 and the use of the two pairs of rivets 84 to secure brake head 52 to compression member 50.

I claim:

1. A brake beam comprising a compression member with a forward web and top and bottom flanges projecting rearwardly therefrom, a brake head, means securing the head to said flanges, a truss lock between the head and web extending substantially inboardly of the head along the web, said lock having a portion disposed outboardly of said compression member, means securing said portion to said head, a diagonal opening in the lock inboardly of the head, and a tension member having a straight end disposed in said diagonal opening and welded to the truss lock at a point inboardly of the head, whereby said members define a short truss.

2. A brake beam, according to claim 1, wherein the outboard end of the web bears against the lock portion and is recessed in the lock inboardly of said portion.

3. In a brake beam, a brake head, a truss structure carrying the head, said structure comprising a compression member having a forward web and top and bottom flanges projecting rearwardly therefrom, said forward web having a weld slot at an end thereof elongated longitudinally of said compression member, a tension member, a truss lock having a base portion in abutment with said web, said lock being recessed in said brake head and having a portion thereof extending inboardly of said head along said web, a diagonal hole in said lock receiving the straight end portion of said tension member inboardly of the head, said weld slot being closed by the truss lock and the tension member extending through the hole and slot, and a weld flowed into said weld slot, solidly joining said tension and compression members and truss lock together.

4. A fabricated truss type brake beam comprising a brake head with a rear wall and top and bottom walls projecting rearwardly therefrom defining a recess and a cavity of greater depth than the recess, a channel section compression member having a forward web and top and bottom flanges projecting rearwardly therefrom, said forward web having a weld slot at an end thereof elongated longitudinally of said compression member and extending inboardly of the head, said compression member being fitted in the cavity, said top and bottom flanges being in abutment with said top and bottom walls, a truss lock fitted in said recess and extending inboardly of the head and continuously abutting said web and provided with a diagonal opening inboardly of said brake head, a tension member having a straight end portion fitted in said opening, and welding means for solidly joining said tension and compression members and truss lock together, and means for securing said brake head to said compression member and said truss lock.

5. A fabricated truss type brake beam comprising a brake head with a rear wall and top and bottom walls projecting rearwardly therefrom defining a recess and a cavity of greater depth than the recess, a channel section compression member having a forward web and top and bottom flanges projecting rearwardly therefrom, said forward web having a weld slot at an end thereof elongated longitudinally of said compression member and disposed substantially inboardly of the head, said compression member being fitted in the cavity, said top and bottom flanges being in abutment with said top and bottom walls, a truss lock fitted in said recess and disposed to abut said web and cover said slot and provided with a diagonal opening inboardly of said brake head, a tension member fitted in said opening and extending therethrough and through said slot, a continuous weld for solidly joining said tension and compression members and truss lock together, and means for securing said brake head to said compression member.

6. A fabricated truss type brake beam comprising a brake head with a rear wall and top and bottom walls projecting rearwardly therefrom defining a recess and a cavity of greater depth than the recess, a channel section compression member having a forward web and top and bottom flanges projecting rearwardly therefrom, said forward web having a weld slot at an end thereof elongated longitudinally of said compression member and extending inboardly of the head, said compression member being fitted in the cavity, said top and bottom flanges being in abutment with said top and bottom walls, a truss lock fitted in said recess and having a recessed portion in continuous abutment with said web end and covering said slot, said lock being provided with a diagonal opening inboardly of said brake head, a tension member fitted in said opening and extending through said slot, welding means for solidly joining said tension and compression members and truss lock together, and means for securing said brake head to said compression member and said truss lock.

7. A fabricated truss type brake beam comprising a brake head with a rear wall and top and bottom walls projecting rearwardly therefrom defining a recess and a cavity of greater depth than the recess, a channel section compression member having a forward web and top and bottom flanges projecting rearwardly therefrom, said forward web having a weld slot at an end thereof, said compression member being fitted in the cavity, said top and bottom flanges being in abutment with said top and bottom walls, a truss lock having a base portion of uniform width fitted in said recess and provided with a diagonal opening inboardly of said brake head, a tension member fitted in said opening, welding means for solidly joining said tension and compression members and truss lock together, and means for securing said brake head to said compression member.

8. A fabricated truss type brake beam comprising a brake head with a rear wall and top and bottom walls projecting rearwardly therefrom defining a recess and a cavity of greater depth than the recess, a channel section compression member having a forward web and top and bottom flanges projecting rearwardly therefrom, said forward web having a weld slot at an end thereof extending substantially inboardly of the head, said compression member being fitted in the cavity, said top and bottom flanges being in abutment with said top and bottom walls, a truss lock fitted in said recess and having a recessed portion in abutment with said web end and provided with a diagonal hole inboardly of said brake head, a tension member extending through said hole and slot, said weld slot being closed by the abutting truss lock, a weld flowed into said weld slot uniting said tension and compression members and truss lock together, rivet means for securing said truss lock to said brake head, and other rivet means for securing said compression member end to said brake head.

9. A fabricated truss type brake beam comprising a brake head with a rear wall and top and bottom walls projecting rearwardly therefrom defining a recess and a cavity of greater depth than the recess, a channel section compression member having a forward web and top and bottom flanges projecting rearwardly therefrom, said forward web having a weld slot at an end thereof, said compression member being fitted in the cavity, said top and bottom flanges being in abutment with said top and bottom walls, a truss lock having a base portion of uniform width fitted in said recess and provided with a diagonal opening inboardly of said brake head, a tension member fitted in said opening, said weld slot being closed by the abutting truss lock, a weld flowed into said weld slot solidly joining said tension and compression members and truss lock together, and rivet means securing said compression member at the top and bottom flanges thereof to said top and bottom walls, respectively.

References Cited in the file of this patent

UNITED STATES PATENTS

| | | |
|---|---|---|
| 956,616 | Williams | May 3, 1910 |
| 984,643 | Bauer et al. | Feb. 21, 1911 |
| 2,382,794 | Johnson | Aug. 14, 1945 |
| 2,475,167 | Whitney | July 5, 1949 |
| 2,493,913 | Busch | Jan. 10, 1950 |
| 2,500,232 | Baselt et al. | Mar. 14, 1950 |
| 2,500,233 | Whitney | Mar. 14, 1950 |
| 2,517,747 | Whitney | Aug. 8, 1950 |
| 2,627,947 | Spaeth | Feb. 10, 1953 |

FOREIGN PATENTS

| | | |
|---|---|---|
| 364,073 | Germany | Nov. 16, 1922 |